A. OSTHEIMER.
THERMOMETER.
APPLICATION FILED DEC. 29, 1915.

1,213,939. Patented Jan. 30, 1917.

Adam Ostheimer
Inventor

By Max A. Schmidt
Attorney

UNITED STATES PATENT OFFICE.

ADAM OSTHEIMER, OF CLEVELAND, OHIO.

THERMOMETER.

1,213,939.   Specification of Letters Patent.   Patented Jan. 30, 1917.

Application filed December 29, 1915.   Serial No. 69,161.

*To all whom it may concern:*

Be it known that I, ADAM OSTHEIMER, a subject of the Emperor of Germany, residing at Cleveland, in the county of Cuyahoga and State of Ohio, have invented certain new and useful Improvements in Thermometers, of which the following is a specification.

The thermometer which is the subject matter of the present application for patent is designed more particularly for use in connection with incubators to indicate the temperature of the eggs, and the invention has for its object to provide a structure whereby external influences liable to affect the correctness of the temperature indication, are practically entirely eliminated, so that the temperature of the eggs will be indicated with the greatest accuracy.

With the object stated in view, the invention consists in a novel combination and arrangement of parts to be hereinafter described and claimed, and in order that the same may be better understood, reference is had to the accompanying drawing forming a part of this specification.

Figure 1:
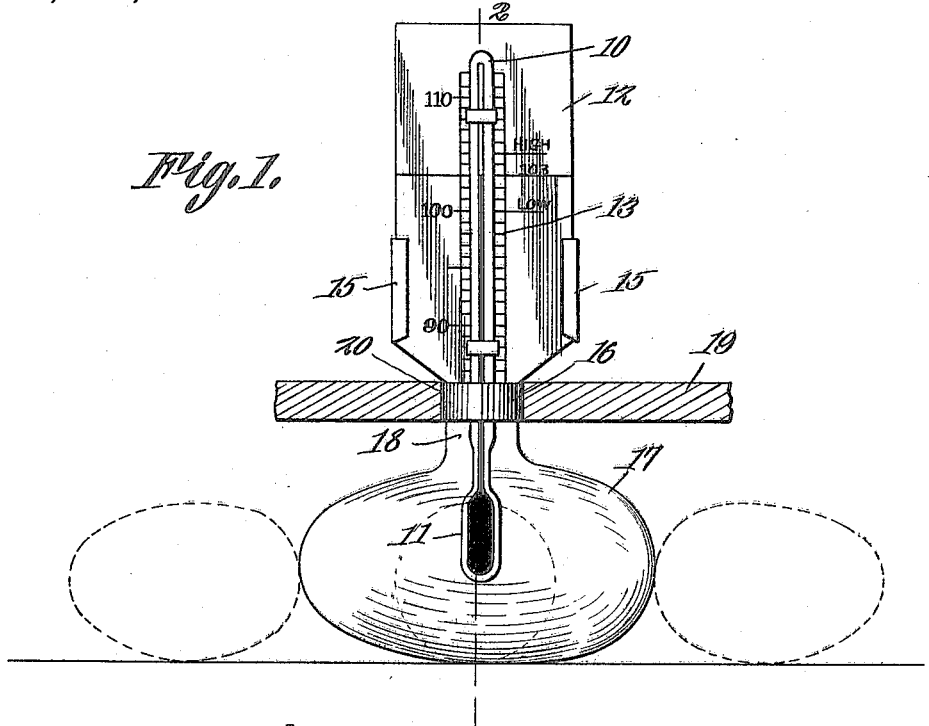
Figure 2:
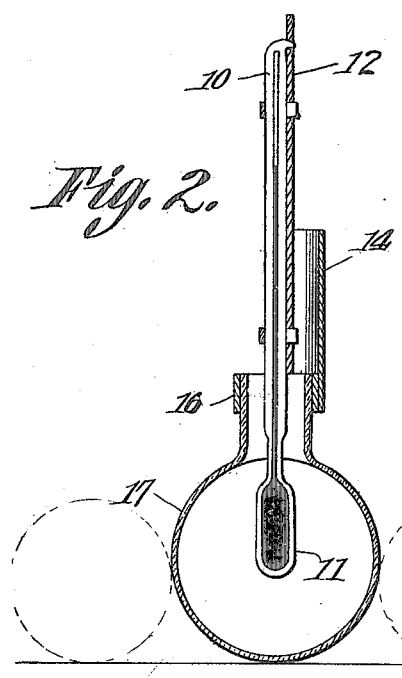
Figure 3:
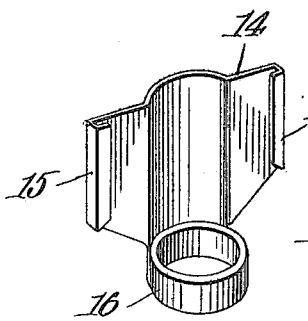

In the drawing, Figure 1 is an elevation of the thermometer; Fig. 2 is a vertical section on the line 2—2 of Fig. 1, and Fig. 3 is a detail in perspective.

Referring specifically to the drawing, 10 denotes the usual glass tube of the thermometer, the same being closed at one end and having at the other end a bulb 11. The tube is mounted on a support comprising a plate 12 having a scale 13 from which the position of the mercury column in the tube is read. The scale plate 12 is carried by a holder comprising a plate 14 having marginal folds 15 at its longitudinal edges, said folds forming channels in which the corresponding edge portions of the scale plate seat, said scale plate being slidable into and out of the channels, and thus removably connected to the holder 14. At the bottom of the holder 14 is a ring 16, whereby said holder is attached to an inclosure 17 for the bulb 11 of the thermometer, said inclosure being of glass and having the shape and size of an egg. The inclosure has a neck 18 through which the lower end of the thermometer tube 10 extends to locate the bulb 11 in the inclosure, and the ring 16 is slipped around said neck to couple the holder 14 to the inclosure. A further support for the thermometer may be a wooden or other plate 19 having an aperture 20 in which the ring 16 seats, the inclosure 17 being on one side of the plate, and the holder 14 on the other side.

The thermometer is designed more particularly for use in connection with incubators to indicate the heat of the eggs. As life enters the embryo at or about the twelfth day of the period of incubation, heat is generated in the egg, which, in addition to the heating means in the incubator, is apt to establish an excessively high temperature and result in the killing of the embryo. It is therefore of the utmost importance to supply fresh air to the incubator for cooling the eggs if they get too hot, and in order that the temperature of the eggs, independent of all external influences as far as possible, may be accurately ascertained, the inclosure 17 has been provided. By providing this inclosure for the thermometer bulb 11, external influences are eliminated to a large degree.

In practice, several eggs are placed in contact with the inclosure as shown dotted in Fig. 1, so that by conduction the inclosure is given substantially the temperature of the eggs, and the temperature inside the inclosure closely approximates the temperature of the egg contents. The thermometer will therefore indicate this temperature, and the proper steps may be promptly taken to cool the eggs if the temperature thereof gets too high. This is usually done by admitting fresh air to the incubator. If the temperature drops below the safety point, the air supply will be shut off.

I claim:

An incubator thermometer comprising a mercury tube and its bulb, a graduated plate carrying the tube, a holder for the plate having marginal bends forming channels in which the plate slidably seats, a ring on the end of the holder, and an egg-contacting inclosure housing the bulb, and having a neck on which the ring is mounted, the bulbed end of the tube passing through the neck.

In testimony whereof I affix my signature in the presence of two witnesses.

ADAM OSTHEIMER.

Witnesses:
RICHARD HAAG,
GEO. D. HAAG.

Copies of this patent may be obtained for five cents each, by addressing the "Commissioner of Patents, Washington, D. C."